United States Patent
Fest et al.

(10) Patent No.: US 10,168,542 B2
(45) Date of Patent: Jan. 1, 2019

(54) POLARIZED PIXELATED FILTER ARRAY WITH REDUCED SENSITIVITY TO MISALIGNMENT FOR POLARIMETRIC IMAGING

(71) Applicant: Raytheon Company, Waltham, MA (US)

(72) Inventors: Eric C. Fest, Tucson, AZ (US); Jon E. Leigh, Tucson, AZ (US)

(73) Assignee: Raytheon Company, Waltham, MA (US)

(*) Notice: Subject to any disclaimer, the term of this patent is extended or adjusted under 35 U.S.C. 154(b) by 647 days.

(21) Appl. No.: 14/836,305

(22) Filed: Aug. 26, 2015

(65) Prior Publication Data
US 2017/0059877 A1    Mar. 2, 2017

(51) Int. Cl.
| | | |
|---|---|---|
| *G02B 27/28* | (2006.01) | |
| *G01J 4/04* | (2006.01) | |
| *G02B 5/20* | (2006.01) | |
| *G06T 7/33* | (2017.01) | |
| *G02B 5/30* | (2006.01) | |

(52) U.S. Cl.
CPC ............. *G02B 27/286* (2013.01); *G01J 4/04* (2013.01); *G02B 5/201* (2013.01); *G02B 5/3025* (2013.01); *G06T 7/344* (2017.01); *G06T 2207/10048* (2013.01)

(58) Field of Classification Search
CPC .................................................. G02B 27/286
See application file for complete search history.

(56) References Cited

U.S. PATENT DOCUMENTS

| | | | |
|---|---|---|---|
| 9,741,163 B2* | 8/2017 | Fest | G06T 7/004 |
| 2003/0157965 A1* | 8/2003 | Marro | H01Q 3/2605 |
| | | | 455/560 |
| 2012/0008133 A1* | 1/2012 | Silny | G01J 3/02 |
| | | | 356/73 |
| 2013/0075585 A1 | 3/2013 | Kobayashi et al. | |

(Continued)

FOREIGN PATENT DOCUMENTS

EP    1560044 A1    8/2005

OTHER PUBLICATIONS

Tyo, J. Scott, "Design of optimal polarimeters: maximization of signal-to-noise ratio and minimization of systematic error," Applied Optics, Feb. 1, 2002, vol. 41, No. 4, pp. 619-630.

(Continued)

*Primary Examiner* — David P Porta
*Assistant Examiner* — Jeremy S Valentiner
(74) *Attorney, Agent, or Firm* — Eric A. Gifford

(57) ABSTRACT

Polarized pixelated filter sub-array is reconfigured to reduce sensitivity to misalignment. The condition number increases more slowly than the standard polarized pixelated filter sub-array as the misalignment increases. In different embodiments, the filter sub-array is configured such that the condition number has a finite bound at ½ pixel misalignment. The angular values of the polarizer filter array are determined to minimize the sensitivity of the condition number of the data reduction matrix to misalignment. This can be achieved by selecting angular values that minimize the expected value of the condition number E(CN) over the range of misalignment.

19 Claims, 7 Drawing Sheets

(56) References Cited

U.S. PATENT DOCUMENTS

2013/0250123 A1* 9/2013 Zhang .................. H04N 5/332
 348/164
2014/0063299 A1* 3/2014 Fest .................... H04N 5/2254
 348/273

OTHER PUBLICATIONS

Hirakawa et al., "Fourier domain design of microgrid imaging polarimeters with improved spatial resolution," Proc. of SPIE, vol. 9099, 2014.
Sabatke et al., "Figures of merit for complete Stokes polarimeter optimization," Proc. of SPIE, vol. 4133, 2000, pp. 75-81.
Tyo, J. Scott, "Optimizing imaging polarimeters constructed with imperfect optics," Applied Optics, Aug. 1, 2006, vol. 45, No. 22, pp. 5497-5503.
Perkins et al., "Signal-to-noise analysis of Stokes parameters in division of focal plane polarimeters," Optics Express 25815, Dec. 6, 2010, vol. 18, No. 25.

* cited by examiner

POLARIZED PIXELATED FILTER ARRAY WITH REDUCED SENSITIVITY TO MISALIGNMENT FOR POLARIMETRIC IMAGING

BACKGROUND OF THE INVENTION

Field of the Invention

This invention relates to polarized pixelated filter arrays for polarimetric imaging, and more particularly to configurations of the polarized pixelated filter sub-array that reduce sensitivity to misalignment to the imaging detector.

Description of the Related Art

Imaging detectors, such as focal plane arrays, generally include an array of pixels, each pixel including a photodetector that generates a signal responsive to light generated or reflected by an object. These signals are collected and combined such that a digital image of the object can be created. Pixelated filter arrays positioned in a fixed location over the detector array are widely used in commercial imaging systems to provide hyperspectral or polarimetric capability. For example, digital cameras use fixed-in-place pixelated filter arrays for color (RGB) photography. These filters reduce the amount of light that reaches the imaging pixel (for example, a red filter reflects blue and green light). Polarimeters can be used to analyze the polarization components of light. Some polarimeters use two or more linear polarizers (polarized pixels) that filter at least half of the incoming light and direct the remaining light to a focal plane. As a result, the brightness of the image at the focal plane is substantially reduced (e.g., by about half). Polarimeters can, for example, be used to extract shape information from an object.

U.S. Patent Publication 2014/0063299 to Fest et. al. entitled "Movable Pixelated Filter Array", which is hereby incorporated by reference, describes polarimetric imaging and introduces a technique for using the data reduction matrix that provides the Stokes vector elements to account for axial and/or lateral misalignment of the pixelated filter array relative to the imaging detector or its conjugate.

Polarimetry requires at least three measurements to analyze the polarization components of light. Typically, the pixelated filter array, and pixelated detector, are divided into groups of four pixels (e.g., a 2×2 sub-array of pixels). Dividing the pixelated detector into larger groups of pixels (e.g., 3×3 or 4×4) is not required and further reduces the spatial resolution of the polarimetric image.

The standard commercially available pixelated filter array is a 2×2 array of linear polarizers having angular values of $\Theta_1=0°$, $\Theta_2=45°$, $\Theta_3=90°$ and $\Theta_4=135°$, respectively as shown in FIG. 2 of U.S. Patent Publication 2014/0063299. For a perfectly aligned pixelated filter array, it is well known that these angular values are optimum. The polarization states are equally spaced throughout the Poincare sphere, which minimizes the condition number (CN) of the data reduction matrix (DRM). The "condition number" is the L2 condition number of the DRM, which is defined as the ratio of the largest and smallest singular values of the DRM. The singular values are computed using the Single Value Decomposition (SVD) of the DRM. The condition number is directly proportional to the noise in the resulting polarimetric image.

The response for a perfectly aligned polarized pixelated filter array is described by equation 9 of the patent publication in which the detector pixel responses P are the product of the measurement matrix Wp and the Stokes vector elements S. The Stokes vector elements S are found by calculating the DRM as the pseudo inverse of the measurement matrix Wp, and computing the product of the DRM and the detector pixel responses P. There is no closed form solution for the pseudo inverse.

Fest et. al. accounts for axial and/or lateral misalignment of the polarized pixelated filter array relative to the imaging detector or its conjugate by modifying terms in measurement matrix Wp as shown in equation 13 of the patent publication. The output of each detector pixel $P_i$ is the sum of the output of every filter pixel that overlaps it, weighted by the overlap area.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a reconfiguration of the polarized pixelated filter sub-array that reduces sensitivity to misalignment. The condition number increases more slowly than the condition number of the standard polarized pixelated filter sub-array as the misalignment increases. In different embodiments, the filter sub-array is configured such that the condition number has a finite bound at ½ pixel misalignment. The tradeoff is a slightly higher condition number for perfect alignment.

In an embodiment, the angular values of the polarizer filter array are determined to minimize the sensitivity of the condition number of the data reduction matrix to misalignment. This can be achieved by selecting angular values that minimize the expected value of the condition number E(CN) over the range of misalignment. In different embodiments, the range of misalignment includes a non-zero probability of a ½ pixel misalignment in the x or y directions. The misalignment of the pixelated filter array in the x and y directions relative to the detector may be modeled as a random variable with a non-zero probability distribution $p_{ma}(x,y)$ (e.g., uniform, Gaussian or other) of misalignment with a range of misalignment in x and y between 0 to ½ pixel.

In an embodiment, if the detector pixels are grouped in 2×2 sub-arrays, the angular values for a 2×2 filter sub-array can be determined to reduce sensitivity to misalignment. However, at ½ pixel misalignment all of the detector pixels have the same polarization, hence contain no information. One option is to accept the risk and use the optimized 2×2 filter sub-array. Another option is to increase the number of pixels of both the detector and the filter sub-arrays to M×M where M is three or greater and determine optimized angular values. Each 2×2 grouping of pixels in the filter sub-array has a different composition of angular values. This maintains the diversity of polarization of the detector pixels with misalignment, and in particular imparts different polarizations on the M×M detector pixels at a ½ pixel misalignment. Another option is to maintain 2×2 sub-arrays of detector pixels while increasing the size of the filter subarray to N×N where N is three or greater. This achieves similar results without further reducing the spatial resolution of the polarimetric image.

If all filter pixels are linearly polarized the transmittance (Tx) of unpolarized light to a point source is 0.5; half of the incident light is lost. In different embodiments, the polarized pixelated filter sub-array is configured to include one or two unpolarized pixel for each grouping of 2×2 pixels. This increases the transmittance to a maximum of 0.75 but increases sensitivity to misalignment. This balanced approach may be achieved by specifying the number of unpolarized "U" pixels per 2×2 grouping, setting a constraint on the Tx (e.g., Tx>0.5) or via a merit functions that weights the relative contributions of minimizing sensitivity to misalignment and maximizing unpolarized transmittance. This filter sub-array can exhibit both less sensitivity to misalignment and greater transmittance of unpolarized light than a standard filter sub-array.

In an embodiment, the angular values of an N×N polarized filter sub-array are determined to minimize a merit function W1*E(CN)+W2*(1/Tx) for an M×M sub-array of detector pixels where M<=N, W1 and W2 are weights that provide relative weight to minimizing sensitivity to misalignment and maximizing transmittance Tx of unpolarized light from a point source. Each 2×2 grouping of filter pixels must include at least two polarized pixels. This leaves two pixels, which can be either linear polarizers to reduce sensitivity or unpolarized pixels to increase transmittance of unpolarized light. For M=2, the compositions of angular values for each 2×2 grouping of filter pixels must be different to ensure diversity of polarization for all misalignments from 0 to ½ pixel.

In different embodiments, a the polarized pixelated filter array comprising one or more filter sub-arrays may be mounted directly on the detector (e.g. FPA), on a relay lens or on a shutter.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
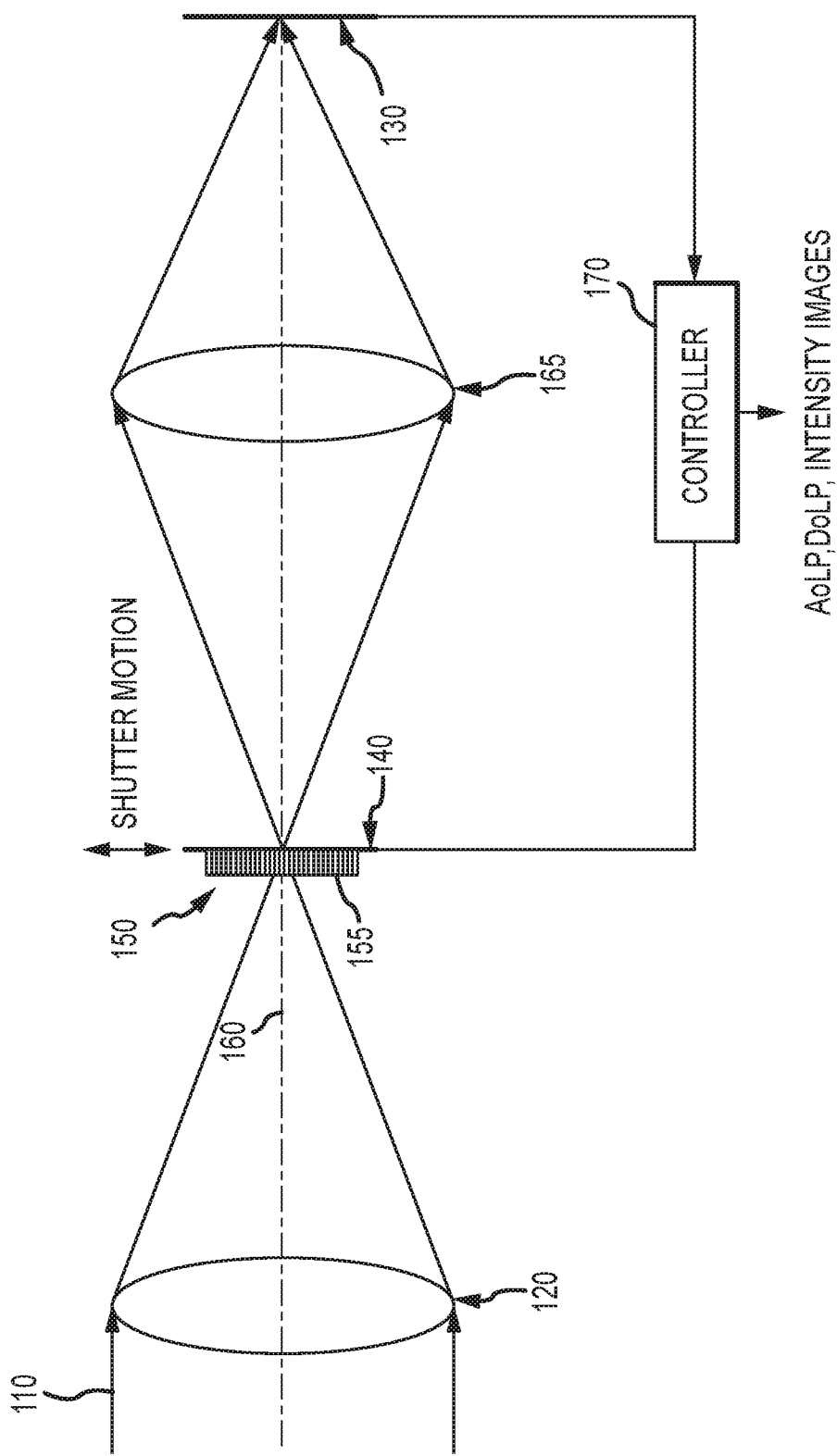
FIG. 1 is a diagram of an embodiment of an optical imaging system with a shuttered polarized pixelated filter array aligned to a focal plane array.

As recognized in U.S. Patent Publication 2014/0063299, a polarized pixelated filter sub-array's data reduction matrix can be modified to account for axial and/or lateral misalignment of the sub-array relative to the imaging detector or its conjugate. However, this approach only goes so far. The quality (e.g., noise level) of the polarimetric image, as measured by the condition number of the data reduction matrix, degrades with increasing misalignment to the point of failure at a ½ pixel misalignment. At ½ pixel, the detected pixel values are all the same, and all zero, hence contain no polarization information causing the condition number to go to infinity. The condition number escalates rapidly as the misalignment approaches ½ pixel.

The present invention provides a reconfiguration of the polarized pixelated filter sub-array that reduces sensitivity to misalignment. The condition number increases more slowly than the condition number of the standard polarized pixelated filter sub-array as the misalignment increases. In different embodiments, the filter sub-array is configured such that the condition number has a finite bound at ½ pixel misalignment. The tradeoff is a slightly higher condition number for perfect alignment. The condition number is less sensitive in terms of an expected value of the condition number to misalignment than the condition number of the standard filter array.

The principles embodied herein are generally applicable for any polarized pixelated filter array and sub-array for use with a pixelated detector in which groups of three or more pixels are read out and processed to form a polarimetric image. The size, shape and layout of both the detector and filter pixels may be arbitrary as long as the requisite three measurements for forming a polarimetric image are made per detector pixel grouping. Each grouping of filter pixels must include at least two linearly polarized pixels. The third measurement may be provided by an additional linearly polarized pixel or an unpolarized "U" pixel. Using all linearly polarized pixels can be optimum from a perspective of reducing sensitivity to misalignment. Using some unpolarized "U" pixels may increase sensitivity by some measure but will increase the transmittance (Tx) of unpolarized light. If the sub-array includes multiple groupings of pixels, the groups should have a different composition of angular values of linear polarization to maintain polarization diversity as misalignment increases.

In most typical imaging applications, the detector and filter pixels are of equal size and shape and laid out on a rectilinear grid format. M×M sub-arrays of detector pixels, where M is an integer of 2 or greater, are read out and processed to form the polarimetric image. The polarized pixelated filter sub-array includes N×N filter pixels where N is an integer >=M. Each 2×2 grouping of filter pixels includes at least two pixels that impart a linear polarization of a certain angular value and exhibit a different composition of angular values than the other groupings. For example, a 3×3 filter sub-array includes four 2×2 groupings, each of which is different.

A polarized pixelated filter array made up of one or more of the filter sub-arrays can be mounted on a shutter and moved in and out of the optical path to alternately provide a polarimetric image or a standard intensity image, on the relay optics or directly on the detector. The polarized pixelated filter array may be integrated with a relay lens and provided as an after market lens for a camera turning an ordinary camera into a polarimeter.

Referring to FIG. 1, there is illustrated a block diagram of one example of an imaging system according to one embodiment. Incoming electromagnetic radiation 110 from a distant object or "scene" is focused by objective optics 120 toward an imaging detector array 130. In one example the imaging detector array 130 is a focal plane array comprised of a grid array of pixels organized in rows and columns. The electromagnetic radiation 110 may include ultraviolet (UV), visible, and/or infrared radiation in one or more of the near infrared (NIR), shortwave infrared (SWIR), midwave infrared (MWIR), longwave infrared (LWIR), and/or very-longwave infrared (VLWIR) spectral bands.

A shutter mechanism 140 is used to move a polarized pixelated filter array 150 made up of one or more filter sub-arrays 155 into and out of the optical path 160 at the focal plane of the objective optics 120. Relay optics 165 relay the focal plane to imaging detector array 130. The shutter mechanism 140 may be operated under the control of a controller 170. The controller may further implement data reduction algorithms to accommodate lateral and/or axial misalignment of the polarized pixelated filter array 150.

The shutter mechanism 140 may include any mechanism that can be used to reliably and repeatably move the polarized pixelated filter array 150 into and out of the optical path 160. According to one embodiment, the shutter mechanism 140 has either very good repeatability in position, for example, approximately ±2 micrometers (µm), or a position encoder that reads out the position of the movable part of the shutter mechanism (to which the polarized pixelated filter array 150 is attached) with very good accuracy, for example, approximately ±2 µm. High accuracy in the position of the shutter mechanism may be necessary to accurately know the position of the polarized pixelated filter array 150 in the optical path 160, which information may be used in the data reduction algorithms discussed further below. In examples in which a shutter mechanism with good repeatability in position is selected, the position of the polarized pixelated filter array 150 in the optical path 160 may be very accurately characterized during set-up or calibration of the imaging system. The known position of the polarized pixelated filter array 150 relative to the imaging detector array 130 may be used in the data reduction algorithms described in U.S. Patent Publication 2014/0063299 to account, in part, for misalignment of the filter and detector arrays. Alternatively, in examples in which the shutter mechanism 140 includes a position encoder, information about the position of the polarized pixelated filter array 150 may be dynamically provided to the controller 170 to be used in the data reduction algorithms.

When the polarized pixelated filter array 150 is not in the optical path, controller 170 directly reads out the detector pixel values to generate a full-resolution intensity image. When the polarized pixelated filter array 150 is in the optical path, assuming a 2×2 sub-array of detector pixels, the controller computes the average of the four pixels to form a reduced resolution intensity image. The controller also computes an Angle of Linear Polarization (AoLP) image and a Degree of Linear Polarization (DoLP) image from the four linearly polarized pixel values.

The misalignment of the pixelated filter array in the x and y directions relative to the detector may be modeled as a random variable with a non-zero probability distribution $p_{ma}(x,y)$ (e.g., uniform, Gaussian or other) of misalignment with a range of misalignment in x and y between 0 to ½ pixel. The probability distribution may or may not be the same in the x and y directions. For example, the probability distribution of misalignment in the direction of shutter motion may be different than the probability distribution of misalignment perpendicular to the direction of shutter motion. Because the filter sub-array is tiled to form the polarized pixelated filter array, the maximum misalignment is ½ pixel.

Modeling the probability distribution of the misalignment is not required for the data reduction algorithms described in U.S. Patent Publication 2014/0063299 to account, in part, for misalignment of the filter and detector arrays. All that is required for those algorithms is a measure of the actual misalignment in order to calculate equation 15.

Modeling the probability distribution of the misalignment is required in the present invention to configure the polarized pixelated filter array 150. The angular values of linear polarization for the filter pixels are selected to minimize sensitivity of the sub-array's condition number of its DRM to misalignment in an expected value sense. In other words, the angular values are those values that minimize the expected value of the condition number E(CN) over the range of misalignment, possibly subject to certain constraints. The condition number for a perfectly aligned array will be higher than that for the standard filter sub-array (0°/45°/90°/135°) but the expected value of the condition number (e.g., noise in the polarimetric image) over the range of misalignment will be lower, hence less sensitive to misalignment as used herein. The certain angular values for a particular filter sub-array will depend on the sizes of the detector and filter pixel sub-arrays, the range of misalignment and the probability distribution of misalignment over those ranges. The selection of the certain angular values may also be affected by the inclusion of one or more unpolarized "U" pixels to increase the transmission of unpolarized light.

Figure 2A:
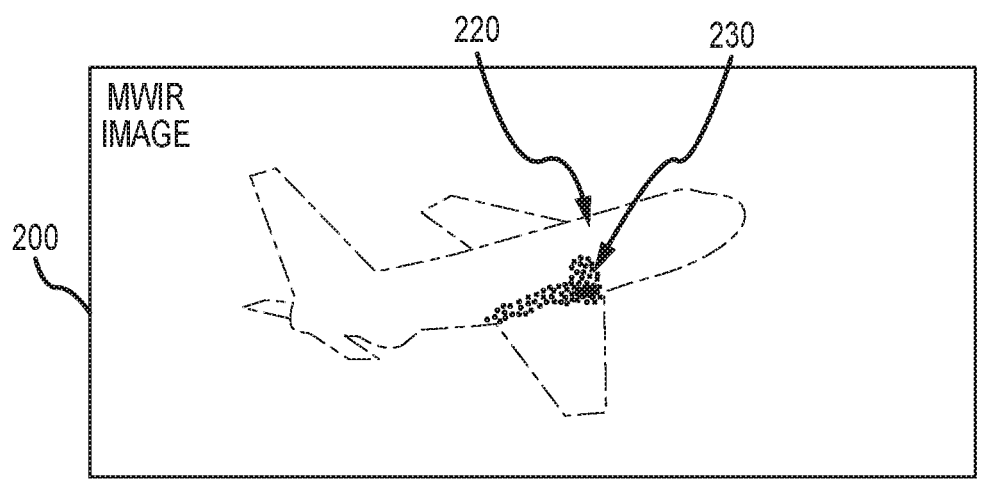
FIGS. 2a and 2b are respectively an MWIR image and a polarmetric image of an aircraft.
Figure 2B:
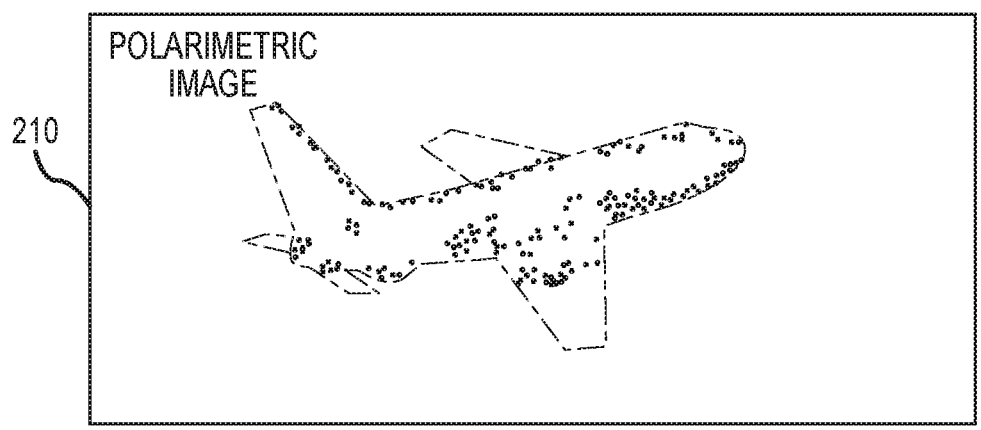

Referring to FIGS. 2a and 2b, the imaging system produces a full-resolution MWIR image 200 and a reduced resolution polarimetric image 210 of an aircraft 220 and its heat plume 230. The MWIR image 200 detects the heat signature of heat plume 230 whereas the polarimetric image (e.g. the DoLP or AoLP) detects the shape of the aircraft (structured polarization) but not the heat plume (random polarization). A 2×2 sub-array of detector pixels is sufficient to provide the three measurements necessary to extract the Stokes vector elements and retains the maximum spatial resolution. Polarimetry can provide significant additional information for object tracking, identification and targeting.

Figure 3B:
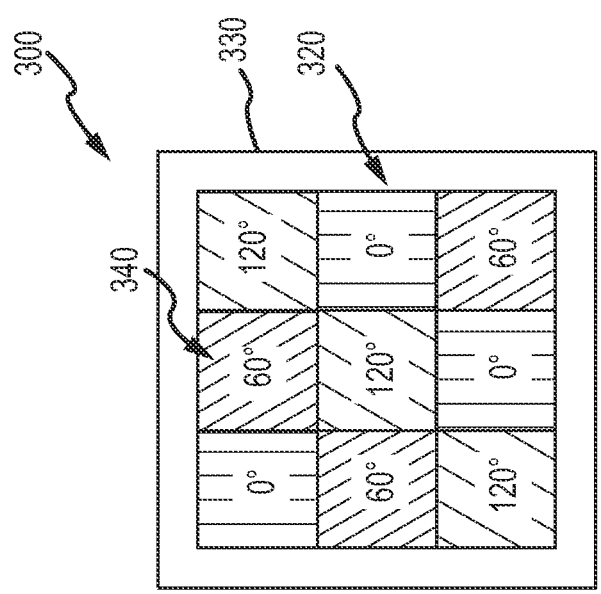
FIGS. 3a and 3b illustrate a 3×3 filter sub-array with a ½ pixel misalignment with a 2×2 sub-array of detector pixels and a physical instantiation of the 3×3 filter sub-array with angular values selected to minimize sensitivity to misalignment.
Figure 3A:
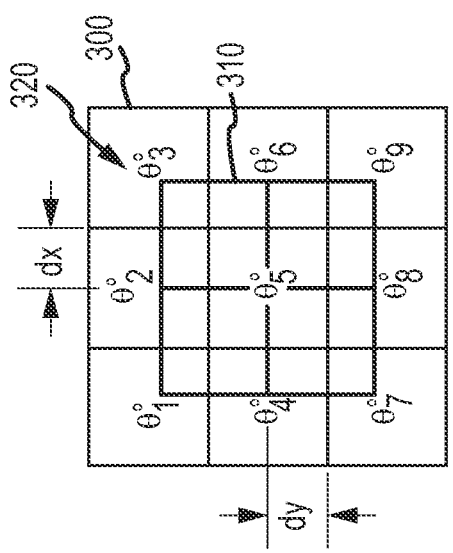

Referring now to FIGS. 3a and 3b, a 3×3 filter sub-array 300 is shown having a ½ pixel misalignment to a 2×2 detector sub-array 310 in both the x and y directions. The filter sub-array 300 has certain angular values $\Theta_1, \Theta_2, \ldots \Theta_9$. There are four 2×2 groupings of filter pixels 320 in a 3×3 filter sub-array ($\Theta_1, \Theta_2, \Theta_4, \Theta_5$), ($\Theta_2, \Theta_3, \Theta_5, \Theta_6$), ($\Theta_4, \Theta_5, \Theta_7, \Theta_8$) and ($\Theta_5, \Theta_6, \Theta_8, \Theta_9$). Each grouping includes at least two filter pixels 320 that impart a linear polarization of a certain angular value. One or two of the filter pixels may, in some cases, be unpolarized "U" pixels. Each grouping has a certain composition of angular values. The composition of each grouping is different in order to maintain a diversity of polarization for the 2×2 detector pixels (and Stokes element vector) as misalignment increases. In particular, if the angular value composition of the groupings is different, at ½ pixel error the linear polarization of the 2×2 detector pixels still maintains a degree of separation (i.e., the average polarizations of the four groupings are different), hence the condition number does not go to infinity.

A physical instantiation of 3×3 filter sub-array 300 includes a carrier 330, which may be a substrate formed of a material that is transparent in the wave band of interest or may be the detector formed of a material that absorbs in the wave band of interest. Each filter pixel 320 is defined by a pattern of alternating opaque and transparent line features 340 formed on the carrier. For example, the opaque line features may be gold wires. The relative width of the opaque and transparent line features affects the efficacy of the polarizer and the amount of unpolarized light that is transmitted. A nominal value of 50% produces a transmission of unpolarized light of 50%. Each line feature is much smaller than the wavelength of incident light. This is referred to an "effective media" regime.

As discussed above, the data reduction algorithms may be used to compensate for axial and/or lateral misalignment of the polarized pixelated filter array 150 relative to the imaging detector array 130 or an associated image plane. In some examples, axial misalignment refers to misalignment in the z dimension, along the optical path leading to the detector, and lateral misalignment refers to misalignment in the orthogonal x and/or y dimensions. According to one embodiment, a data reduction algorithm includes a data reduction matrix M for each group of m detector pixels. The polarized pixelated filter sub-array includes a group of n filter pixels where n>=m. The data reduction matrix M is used to compute the Stokes vector elements S ($S_0$, $S_1$, $S_2$) from the counts output from multiple detectors, which together are expressed as a vector P. Thus, $$S = M*P \quad (1)$$

M is computed as the pseudoinverse of a measurement matrix $W_p$:

$$M = W_p^{-1} \quad (2)$$

$W_p$ is determined by the design of the pixelated filter sub-array.

The measurement matrix Wp is generalized in equation (3):

$$\vec{P} = \vec{W}_p \cdot \vec{S} = \begin{pmatrix} P_1 \\ P_2 \\ \ldots \\ P_m \end{pmatrix} =$$

$$\begin{pmatrix} \sum_{x=1}^{n} f_{x,1} \tau_{unp\_x} & \sum_{x=1}^{n} f_{x,1} \tau_{unp\_x} D_x \cos 2\theta_x & \sum_{x=1}^{n} f_{x,1} \tau_{unp\_x} D_x \sin 2\theta_x \\ \sum_{x=1}^{n} f_{x,2} \tau_{unp\_x} & \sum_{x=1}^{n} f_{x,2} \tau_{unp\_x} D_x \cos 2\theta_x & \sum_{x=1}^{n} f_{x,2} \tau_{unp\_x} D_x \sin 2\theta_x \\ \ldots & \ldots & \ldots \\ \sum_{x=1}^{n} f_{x,m} \tau_{unp\_x} & \sum_{x=1}^{n} f_{x,m} \tau_{unp\_x} D_x \cos 2\theta_x & \sum_{x=1}^{n} f_{x,m} \tau_{unp\_x} D_x \sin 2\theta_x \end{pmatrix}$$

$$\begin{pmatrix} S_0 \\ S_1 \\ S_2 \end{pmatrix}$$

In Equation (3), $f_{x-i}$ is a function describing the fractional area overlap of the filter pixel at angle x over detector pixel i. The output of each detector pixel $P_i$ is the sum of the output of every filter pixel that overlaps it, weighted by the overlap area. $\Theta_x$ is the angular value of the $x^{th}$ filter pixel of the sub-array. $\tau_{unp\_x}$ is the transmittance of unpolarized light of the $x^{th}$ filter pixel; ½ if the pixel has a linear polarization and 1 if the pixel is unpolarized. $D_x$ is the diattenuation of the $x^{th}$ filter pixel; 1 for a polarized pixel and 0 for an unpolarized pixel. The construction of measurement matrix Wp allows for selection of angular values $\Theta_x$ to minimize sensitivity to misalignment, inclusion of one or more unpolarized pixels in each 2×2 grouping of filter pixels and implementation of a filter sub-array that is larger than the detector sub-array.

There are many different ways to design the pixelated filter sub-array to reduce sensitivity to misalignment. Misalignment of the filter sub-array to the detector array produces noise in the polarimetric image. The amount of noise is measured by the condition number of the DRM.

In known polarimetric imaging systems, the filter sub-array was designed such that the polarization states were equally spaced throughout the Poincare sphere. This minimizes the condition number for a perfectly aligned system.

Our approach is fundamentally different. We design the filter sub-array to minimize the expected value of the condition number over a non-zero range of misalignment in the x or y directions, possibly subject to certain constraints (e.g. detector sub-array, filter sub-array and unpolarized transmittance). We sacrifice some performance for a perfectly aligned system to achieve better performance over the range of possible misalignment and, in some cases, to avoid failure at ½ pixel misalignment.

Figure 4:
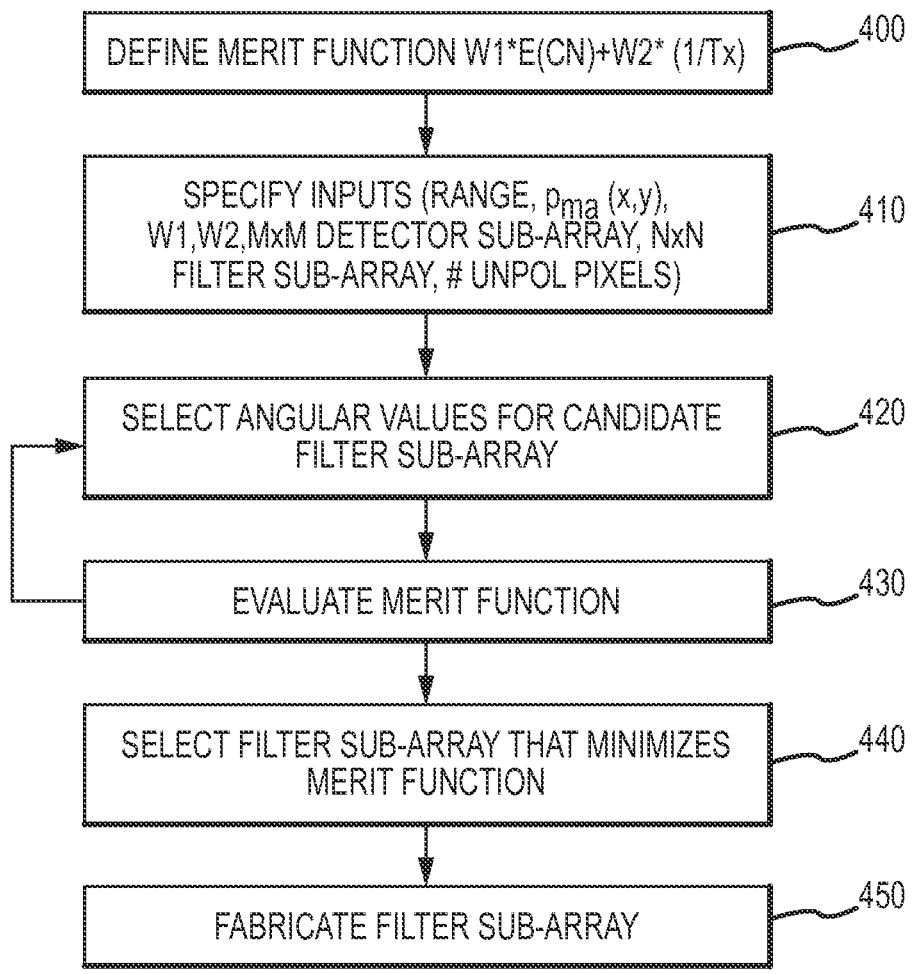
FIG. 4 is a flow diagram of an embodiment for configuring a polarized pixelated filter sub-array.

Referring to FIG. 4, in an embodiment, the polarized pixelated filter sub-array is designed by defining a merit function to evaluate and select candidate filter sub-array designs (step 400). In this example, the merit function is a weighted sum of the expected value of the condition number E(CN) and one over the transmittance (1/Tx) of unpolarized light from a point source, W1*E(CN)+W2(1/Tx). An approximately equivalent merit function is simply E(CN) with a constraint on the number of unpolarized "U" pixels per 2×2 grouping in the filter sub-array.

Design inputs including the size M of the M×M sub-array of detector pixels, the size N of the N×N sub-array of filter pixels, the non-zero range of possible misalignments, the probability distribution pma(x,y) over the range, the weights W1 and W2 and the number of "U" pixels in each 2×2 grouping of filter pixels (step 410). M is an integer of 2 or greater. N is an integer greater than or equal to M. $p_{ma}(x,y)$ is non-zero over the defined range. For example, $p_{ma}(x,y)$ may be uniform or Gaussian. Alternately, $p_{ma}(x,y)$ may be an arbitrary distribution based on statistics of actual measurements for a given application.

Angular values $\Theta_x$ are selected to populate a candidate filter sub-array subject to constraints on a specified number of U pixels, having at least two linearly polarized pixels per 2×2 grouping of filter pixels, and, if N>M, the different 2×2 groupings of filter pixels having different compositions of angular values (step 420).

The merit function is evaluated for the candidate filter sub-array (step 430). The transmission of unpolarized light Tx for a filter sub-array is computed as the average of the individual filter pixel transmittance. Typically an unpolarized filter pixel transmittance is 100% and a polarized filter pixel transmittance is 50%. For example, if all the filter pixels are linearly polarized the overall transmittance is 50%. For a 2×2 filter sub-array if two of the pixels are unpolarized the transmittance is 75%. The transmittance is not a function of misalignment.

The expected value of the condition number E(CN) is computed by defining the measurement matrix Wp for a given misalignment within the specified range, computing the pseudo inverse of Wp to get the DRM, computing a Singular Value Decomposition of the DRM, and taking the ratio of the largest and smallest singular values to yield the condition number. This is repeated for multiple steps over the specified range. The resulting condition numbers are then summed or integrated using the $p_{ma}(x,y)$ to give E(CN).

Steps 420 and 430 are repeated for multiple candidate filter sub-arrays. The search can be a brute force search over all possible combinations of angular values that satisfy the constraint. Alternately, search optimization techniques such as gradient slope can be employed to find the solution more efficiently.

The candidate filter sub-array that minimizes the merit function is selected (step 440). A filter sub-array or filter array made up of one or more filter sub-arrays is fabricated (step 450).

Figure 5:
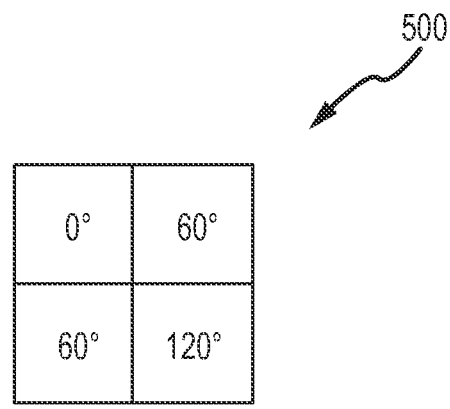
FIG. 5 is an embodiment of a 2×2 filter sub-array configured to minimize sensitivity.

Referring now to FIG. 5, an optimized filter sub-array 500 imparts a linear polarization on each of the four filter pixels. This filter sub-array has a transmittance of 0.5. The filter sub-array was designed for a 2×2 grouping of detector pixels assuming a uniform probability of misalignment from 0 to ½ pixel ** (not including ½ pixel). The angular values 0°, 60°, 60° and 120° are materially different than the angular values 0°, 45°, 90° and 130° designed for a perfectly aligned system. On an expected value basis, our filter sub-array will outperform the standard filter sub-array.

Figure 6:
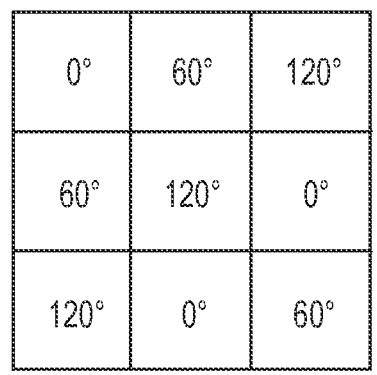
FIG. 6 is an embodiment of a 3×3 filter sub-array configured to minimize sensitivity to misalignment to a 2×2 sub-array of detector pixels.

Referring now to FIG. 6, to account for a non-zero probability of a ½ pixel misalignment in the x or y directions an optimized filter sub-array 600 has a 3×3 sub-array of filter pixels each of which imparts a linear polarization of a certain angular value. This sub-array has a transmittance of 0.5. The filter sub-array was designed for a 2×2 grouping of detector pixels assuming a uniform probability of misalignment from 0 to ½ pixel in the x and y directions. Note, the four 2×2 groupings of filter pixels each have a different composition of angular values (0°, 60°, 60°, 120°), (60°, 120°, 120°, 0°), (60°, 120°, 1200°, 0°) and (120°, 0°, 0°, 60°). This serves to increase the spacing of the polarization states throughout the Poincare sphere as misalignment increases and to prevent the polarization states from collapsing to the same point at ½ pixel error. Even at ½ pixel error, polarization information can be extracted.

Figure 7:
FIG. 7 is an embodiment of a 2×2 filter sub-array configured to maximize transmittance of unpolarized light for a 2×2 sub-array of detector pixels.

Referring now to FIG. 7, an optimized filter sub-array 700 provides a maximum unresolved target transmittance of 0.75 and a minimum condition number assuming perfect alignment subject to the transmittance constraint for a 2×2 grouping of detector pixels and filter pixels. Constraining the filter sub-array to 2×2 has the effect of producing a condition number that is actually more sensitive to misalignment than the standard filter sub-array albeit with higher unresolved target transmittance.

Figure 8:
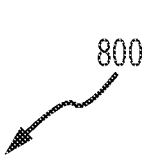
FIG. 8 is an embodiment of a 4×4 filter sub-array configured to balance minimizing sensitivity to misalignment and maximizing transmittance of unpolarized light for a 2×2 sub-array of detector pixels.

Referring now to FIG. 8, to account for both an unresolved target transmittance of 0.75 and misalignment, including ½ pixel misalignment, an optimized filter sub-array 800 has a 4×4 sub-array of filter pixels. Each 2×2 grouping of filter pixels includes to unpolarized "U" pixels and two pixels that impart a linear polarization of a certain angular value. Furthermore, each of the 2×2 groupings of filter pixels has a different composition of angular values. Note, the 4×4 size of the sub-array (more generally an even integer >2) is required for symmetry reasons given the constraint of 2 unpolarized filter pixels such that each 2×2 grouping includes the requisite number of polarized and unpolarized pixels. By comparison, this filter sub-array has greater Tx than the 3×3 filter sub-array 600 (0.75 vs 0.50) but is more sensitive to misalignment. However, this filter sub-array has both greater Tx than the standard 2×2 filter sub-array ((0.75 vs 0.50) and is less sensitive to misalignment.

Figure 9:
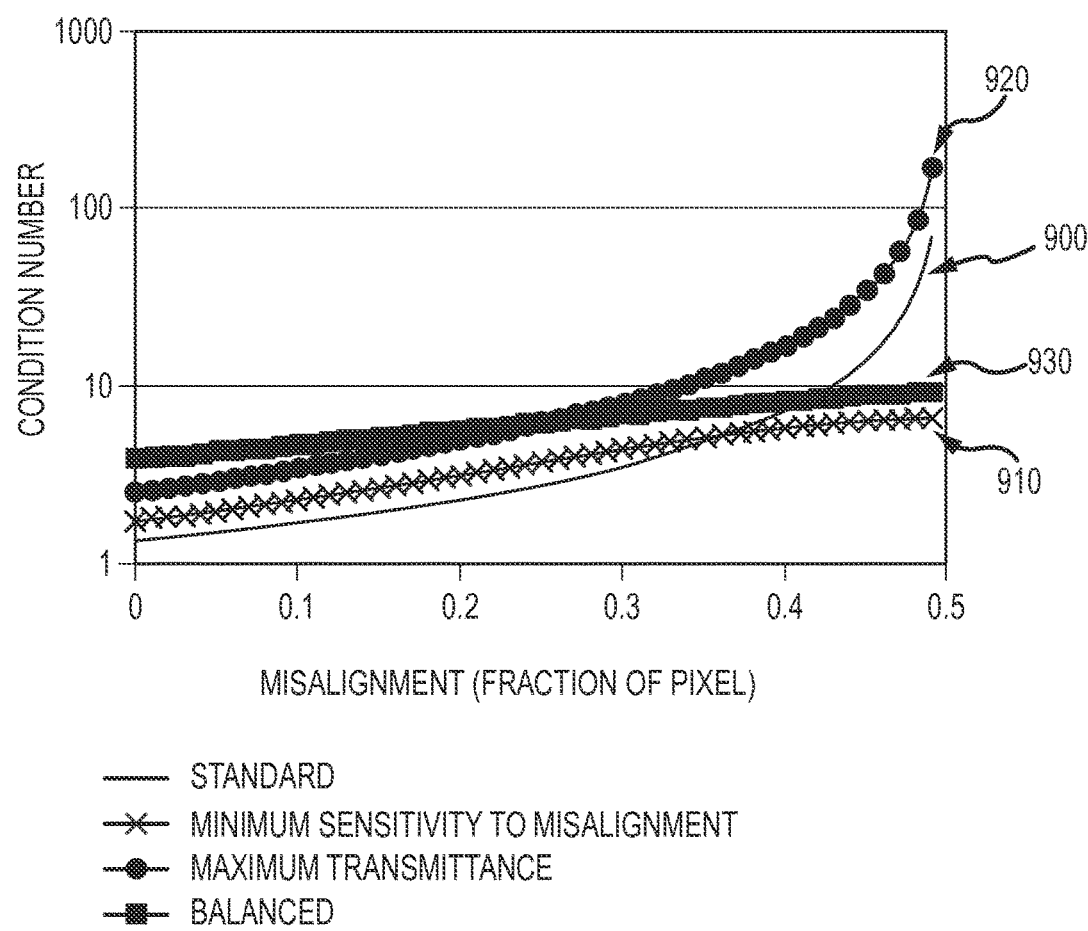
FIG. 9 is a plot of condition number versus misalignment for different filter sub-arrays.

Referring now to FIG. 9, the condition number for a filter sub-array is plotted versus misalignment out to ½ pixel. The condition number 900 for the standard 2×2 filter sub-array (0°, 45°, 90°, 135°) is minimum at 0 misalignment, increases rapidly as it approaches ½ pixel and goes to infinity at ½ pixel. The condition number 910 for the 3×3 filter sub-array 600 optimized for minimum sensitivity is slightly higher than the standard at 0 misalignment and increases gradually as it approaches and reaches ½ pixel. The condition number 920 for the 2×2 filter sub-array (U, 0°, 45°, U) 700 is slightly higher at 0 misalignment, increases rapidly as it approaches ½ pixel and goes to infinity at ½ pixel, even worse than the standard 2×2 filter sub-array (albeit with higher transmittance). The condition number 930 for the 4×4 filter sub-array 800 optimized for both minimum sensitivity and maximum transmittance is slightly higher than the standard at 0 misalignment and increases gradually as it approaches and reaches ½ pixel. This filter sub-array is more sensitive to misalignment than the one optimized solely for misalignment but remains bounded as the misalignment reaches ½ pixel.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of fabrication of a polarized pixelated filter array to selectively polarize electromagnetic radiation for use with a pixelated detector having dimensions in the x and y directions for which sub-arrays of three or more pixelated detector pixels P are read out and processed to form a polarimetric image, said method comprising:

selecting a size of a filter sub-array having dimensions in the x and y directions to include three or more filter pixels Q where Q>=P;

defining a non-zero probability distribution $p_{ma}(x,y)$ that models the misalignment of the filter sub-array in the x and y directions relative to the pixelated detector as a random variable with a range of misalignment in the x and y directions;

defining a merit function including at least a first term W1*E(CN) where W1 is a weight and E(CN) is an expected value of a condition number (CN) of a data reduction matrix for the filter sub-array over the range of misalignment;

evaluating the merit function for a plurality of candidate filter sub-arrays, each grouping of P pixels in a candidate filter sub-array including at least two pixels that impart a linear polarization of different angular values;

selecting the candidate filter sub-array that minimizes the merit function; and fabricating the polarized pixelated filter array comprising one or more of the selected candidate filter sub-arrays for use with the pixelated detector.

2. The method of claim 1, wherein each said grouping of P pixels in the filter sub-array includes at least one unpolarized pixel.

3. The method of claim 1, wherein said pixelated detector pixels are read out and processed in M×M sub-arrays where M>=2 and said filter sub-array pixels are arranged in an N×N grid format in the x and y directions where N is >=M, each M×M grouping of pixels in the filter sub-array including at least two pixels that impart a linear polarization of a different angular value.

4. The method of claim 3, wherein M=2.

5. The method of claim 4, wherein N>2.

6. The method of claim 4, wherein N=3, said 3×3 grid format comprising four 2×2 groupings of pixels in the filter sub-array, each said grouping including at least three pixels that impart linear polarizations of different angular values or at least two pixels that impart linear polarizations of different angular values and at least one unpolarized pixel.

7. The method of claim 3, wherein each 2×2 grouping of pixels in the filter sub-array includes at least one unpolarized pixel.

8. The method of claim 7, where N is an even integer.

9. The method of claim 1, wherein said range of misalignment spans 0 to ½ pixel in the x or y directions.

10. The method of claim 1, wherein sub-arrays of M×M pixelated detector pixels are read out and processed to form the polarimetric image, where M is at least 2, wherein the size of the filter sub-array is selected to include N×N pixels where N>=M.

11. The method of claim 10, wherein M=2 and N>M.

12. The method of claim 11, wherein at least one pixel in each 2×2 grouping is an unpolarized pixel.

13. The method of claim 12, wherein the merit function includes a second term W2*(1/Tx) where W2 is a weight and Tx is the transmittance of unpolarized light from a point source, further comprising selecting non-zero values of the weights W1 and W2.

14. The method of claim 10, wherein each 2×2 grouping of pixels in the filter sub-array include at least three pixels that impart linear polarizations of different angular values or at least two pixels that impart linear polarizations of different angular values and at least one unpolarized pixel.

15. The method of claim 1, wherein the pixelated detector and filter sub-array pixels are of equal size and shape and laid out on a rectilinear grid format.

16. The method of claim 1, wherein sub-arrays of 2×2 pixelated detector pixels are read out and processed to form the polarimetric image, wherein selecting the candidate filter sub-array comprises selecting a filter sub-array in which a plurality of pixels are arranged in a 4×4 grid format in the x and y directions, including 8 pixels that impart a linear polarization of a certain angular value and 8 unpolarized, U, pixels, wherein the relative angular values for the 4×4 grid format are:

| U | 70° | U | 110° |
|---|---|---|---|
| 215° | U | 5° | U |
| U | 140° | U | 20° |
| 200° | U | 45° | U. |

17. A method of fabrication of a polarized pixelated filter array to selective polarize electromagnetic radiation for use with a pixelated detector having dimensions in the x and y directions for which 2×2 sub-arrays of pixelated detector pixels are read out and processed to form a polarimetric image, said method comprising:
  selecting a size of a filter sub-array having dimensions in the x and y directions to include N×N filter pixels where N>2;
  defining a non-zero probability distribution $p_{ma}(x,y)$ that models the misalignment of the filter sub-array in the x and y directions relative to the pixelated detector as a random variable with a range of misalignment in the x and y directions;
  defining a merit function including at least a first term W1*E(CN) where W1 is a weight and E(CN) is an expected value of a condition number (CN) of a data reduction matrix for the filter sub-array over the range of misalignment;
  evaluating the merit function for a plurality of candidate N×N filter sub-arrays, each 2×2 grouping of pixels in a candidate filter sub-array including at least three pixels that impart linear polarizations of different angular values or at least two pixels that impart linear polarizations of different angular values and at least one unpolarized pixel;
  selecting the candidate filter sub-array that minimizes the merit function; and
  fabricating the polarized pixelated filter array comprising one or more of the selected candidate filter sub-arrays for use with the pixelated detector.

18. The method of claim 17, wherein at least one pixel in each 2×2 grouping in the selected candidate filter sub-array is an unpolarized pixel.

19. The method of claim 18, wherein the merit function includes a second term W2*(1/Tx) where W2 is a weight and Tx is the transmittance of unpolarized light from a point source, further comprising selecting non-zero values of the weights W1 and W2.

* * * * *